Feb. 13, 1968   J. E. DUEKER   3,369,124
PHOTOVOLTAIC DEVICE FOR INDICATING POSITION AND
INTENSITY INCLUDING PERIPHERAL ELECTRODE
Filed May 29, 1963
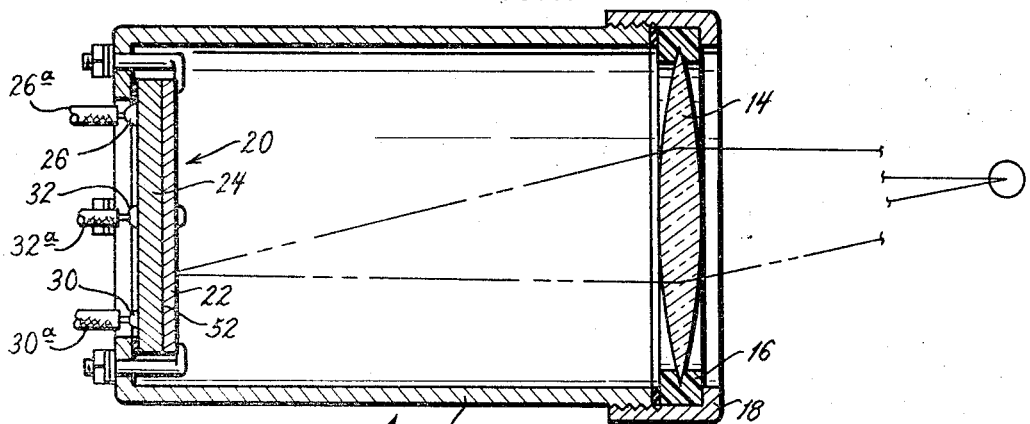
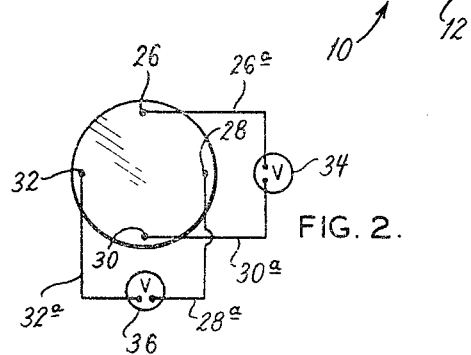
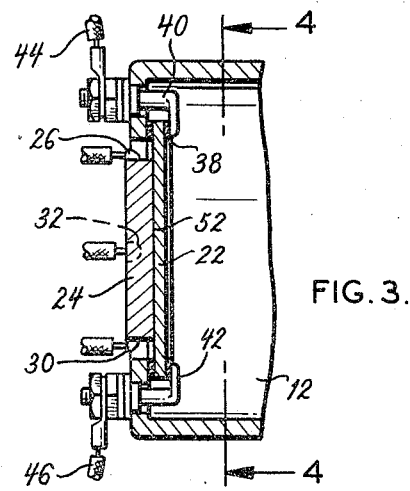
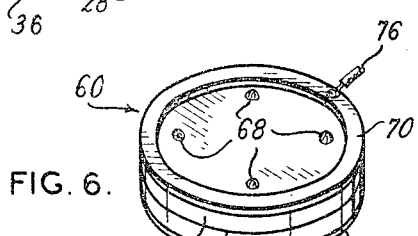
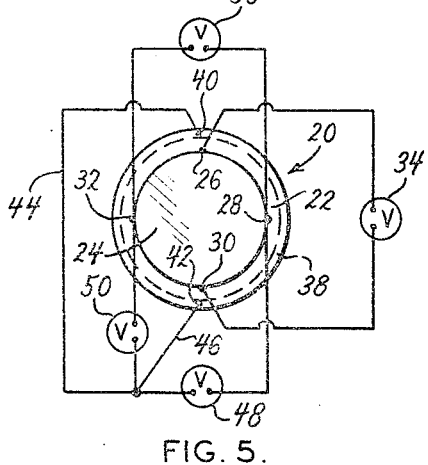
INVENTOR.
JAMES E. DUEKER
BY
Gravely, Lieder & Woodruff
ATTORNEYS

United States Patent Office 3,369,124
Patented Feb. 13, 1968

3,369,124
PHOTOVOLTAIC DEVICE FOR INDICATING POSITION AND INTENSITY INCLUDING PERIPHERAL ELECTRODE
James E. Dueker, St. Louis County, Mo., assignor to McDonnell Aircraft Corporation, St. Louis County, Mo., a corporation of Maryland
Filed May 29, 1963, Ser. No. 284,092
12 Claims. (Cl. 250—211)

The present invention relates generally to light sensitive devices and more particularly to a novel light sensitive device capable of producing voltage responses when a light spot impinges thereon.

The subject invention is an improvement over an invention covered by co-pending application Ser. No. 280,597 filed May 15, 1963, and invented by Messrs. Albert E. Lombard, Jr., and James E. Dueker.

Certain limitations exit in known light sensitive detector devices that are capable of sensing and determining both the lateral position and the intensity of a light spot impinging thereon. Many of these limitations are due to interferences between the means provided to locate the position of the light spot on the detector and the means for measuring the intensity of the light spot. Furthermore, these interferences are also due in large part to locations of the electrodes and particularly the location of electrodes in the light sensitive area upon which the light spot impinges. The interferences referred to can produce ambiguous and misleading information. The present invention overcomes these and other limitations and shortcomings of known light sensitive detector devices by providing more desirable locations for the electrodes. It is therefore possible with the present device to obtain more accurate and less ambiguous information as to the location of a light spot impinging on the detector and as to the intensity of said light spot. The subject invention therefore is an improvement over known light sensitive devices.

The present invention resides in the construction and operation of a light sensitive wafer element formed by two layers of a material having different conductivity characteristics, a plurality of spaced electrodes attached to one of said layers defining an observation field therebetween, and another electrode attached to the other layer and positioned extending around the observation field, said other electrode being located outwardly on the element relative to the aforementioned electrodes. The subject invention also includes voltage sensitive means connected between selected pairs of said plurality of electrodes to determine the location of a light spot impinging thereon, and other voltage sensitive means connected between said other electrode and at least one of said plurality of electrodes to measure the intensity of the light spot. A modified form of the subject device has the said other electrode on the same side of the wafer element as the plurality of electrodes and a metallic coating on the opposite side of said element, the intensity of light impinging on the element being measured by means connected between said other electrode and the metal coating. The invention may also include means for focusing light from a remote source into a spot impinging on the observation field. It is therefore a principal object of the present invention to provide a light sensitive detector device capable of eliminating interferences between different functions thereof.

Another object is to provide a light sensitive detector capable of producing unambiguous information as to position and intensity.

Another object is to provide an improved photovoltaic detector device capable of simultaneously producing information as to the lateral position of a light spot impinging thereon and as to the intensity of said light spot.

Another object is to increase the usable light sensitive area of a detector device and to eliminate the requirement of providing masking and other devices to prevent light from impinging on certain portions thereof.

Another object is to reduce the number of electrodes attached to the light sensitive areas of a detector.

Another object is to simplify the construction of the photovoltaic detectors and the like and to make them less subject to damage during manufacture.

Another object is to provide a light sensitive device capable of being mounted in several different operating positions relative to a light source.

Another object is to provide a light detector capable of operating on all wave lengths of light.

Another object is to provide a light detector capable of accurately determining the location and intensity of a remote light source relative thereto.

These and other objects and advantages of the present invention will become apparent after considering the following specification in conjunction with the accompanying drawing wherein:

FIG. 1 is a cross-sectional view through a detector device constructed according to the present invention;

FIG. 2 is a schematic view of a simple electric circuit for a portion of the subject detector;

FIG. 3 is an enlarged fragmentary cross-sectional view of the light detector portion of the present invention;

FIG. 4 is a cross-sectional view taken on line 4—4 of FIG. 3;

FIG. 5 is another schematic view of an electric circuit for the subject device; and FIG. 6 is a perspective view showing a modified form of light sensitive detector wafer.

Referring now to the drawings by reference numbers, the number 10 refers to a detector constructed according to the present invention. The detector 10 includes a tubular housing 12 with a lens 14 and lens mounting means 16 therefor mounted at one end thereof and held in position by a closure member 18. A detector element or wafer 20 is mounted at the opposite end of the tubular member 12.

The detector element 20 is constructed of a first layer of material 22 having predetermined conductivity characteristics and a second layer 24 of material intimately engaged with layer 22 but having different conductivity characteristics. A plurality of spaced electrodes 26, 28, 30 and 32 are attached to the layer 24 and are connected or soldered respectively to the associated leads 26a, 28a, 30a and 32a. The electrodes 26, 28, 30 and 32 are provided for locating the lateral position of a light spot impinging on the element 20.

A simplified view of a typical circuit for the lateral position locating electrodes is shown in FIG. 2 and includes a voltmeter 34 connected by leads 26a and 30a to the opposite electrodes 26 and 28, and another voltmeter 36 connected by leads 28a and 32a to the opposite electrodes 28 and 32. As already mentioned, the voltmeters 34 and 36, or other similar voltage responsive devices, are provided to locate the position of a light spot impinging upon the detector 20. For this purpose, the electrodes 26 and 30 are preferably located on opposite ends of a diameter of the device if the device is round, which diameter can also be considered as one axis of a coordinate system. The electrodes 28 and 32 can likewise be considered as located on opposite ends of another diameter perpendicular to the aforementioned diameter or axis.

Of particular importance to the present invention is the provision of a peripheral electrode 38 which extends around the periphery of the detector element 20 on the opposite side thereof or on the opposite layer from the layer to which the electrodes 26, 28, 30 and 32 are attached. The electrode 38 is also positioned outwardly of the electrodes 26, 28, 30 and 32 so that the space generally defined within the last named electrodes, which is the main light sensitive area, is uninterrupted and is entirely available for use in determining the lateral position of a light spot impinging upon the detector. This is important to the present invention because it enables the device to determine intensity and location without interference between the separate means employed for each purpose. This construction and location of elements also eliminates false and ambiguous readings both as to location and intensity.

In FIGS. 3 and 4 the detector element 20 is shown as being round and the peripheral electrode 38 is annular and is positioned on the side of the detector on which the light spot impinges. For illustrative purposes, the peripheral electrode 38 is also shown provided with two spaced connector electrodes 40 and 42 located on opposite sides thereof. The electrodes 40 and 42 are connected by wires 44 and 46, respectively, to other voltmeters the opposite sides of which are connected to desired ones of the aforementioned electrodes 26–32.

A typical circuit for connecting the electrodes 40 and 42 to voltage sensitive devices is shown in FIG. 5. The circuit shown in FIG. 5 is similar to the circuit in FIG. 2 so far as the voltmeters 34 and 36 are concerned, but in addition, includes other voltmeters 48 and 50. The voltmeter 48 is shown for illustrative purposes connected between the electrodes 28 and 42, and the voltmeter 50 is shown connected between the electrodes 32 and 40. Inasmuch as the peripheral electrode 38 is made of conductive material it is not essential to have the electrodes 40 and 42 spaced from each other, or is it even necessary to provide more than one such connector electrode, although any desired number could be provided, and additional voltage sensitive devices could also be connected between the electrodes 38 and the other electrodes. Furthermore, the electrode 38 is shown as ring shaped although other shapes can also be used, the only requirement being that the electrode 38 be located outside of the principal light sensitive area of the detector on which the light spot impinges as defined by the electrodes 26–32.

The detector 20 is formed by two layers of material 22 and 24 as aforesaid which have different conductivity characteristics and which are sensitive to light impinging thereon. For example, the layers can be formed of materials such as silicon, aluminum, titanium and numerous other elements, they can be formed of semi-conductor materials in which one of the layers is a P-type semiconductor material and the other a N-type semi-conductor, and they can be formed of other materials and substances so long as the selected materials have different conductivity characteristics. The materials must also have a junction or barrier 52 therebetween so that one layer will release holes and the other electrons when exposed to light. The selected materials are intimately connected together during formation of the detector with one of the layer materials penetrating the other to form the junction 52 therebetween.

The holes that are released in one of the layers migrate to the other layer through the junction 52 and the electrons that are released also migrate through the junction. However, the layer in which the holes are released usually has a higher conductivity for holes than for electrons and the holes disperse throughout this layer adjacent to the junction or barrier and the holes that are able to pass through the junction will usually cross back through the junction to the layer of higher conductivity and become minority carriers. As a result of this action of the holes and electrons, lateral voltages are produced between the spaced electrons 26–32 and these voltages will be recorded on the associated voltmeters connected between the various opposite pairs of these electrodes. These readings can be used to determine the location at which the light spot impinges on the detector, and can also be used to determine the relative positions and changes in the relative positions of the light source and the detector.

The voltages which are sensed by the voltmeters 48 and 50, however, which are connected between the electrode 38 and the electrodes 26, 28, 30 or 32, are taken across the junction 52 and are proportional to the intensity of the light spot. This information can be used to determine the distance and changes in the distance between the light source and the detector.

Providing a peripheral electrode for intensity measurement has the advantage over a centrally located electrode because it eliminates interferences and disturbances between the different purpose electrodes. Furthermore, a peripheral electrode does not lessen the area of the light sensitive portions of the detector or damage the light sensitive area during construction. Furthermore, it makes it possible for the subject detector to be more accurate and reliable for both of its intended functions. Also by having a peripheral electrode for intensity measurement ambiguous information and readings are eliminated.

A modified form of detector wafer is shown in FIG. 6. The modified wafer 60 includes two layers 62 and 64 formed of different conductivity material with a junction 66 therebetween. A plurality of spaced position locating electrodes 68 are attached to the layer 62, and a peripheral intensity measuring electrode 70 is also attached to the layer 62. The electrode 70 is shown adjacent to the edge of the wafer although the precise location, size and shape of the electrode 70 are not critical just so long as it is located without the light sensitive area defined by the electrodes 68. The modified wafer 60 is similar to the wafer 20 but differs therefrom because it has the peripheral light intensity electrode 70 located on the same side as the electrodes 68. The modified wafer 60 also differs from the wafer 20 because it has a metal backing layer 72 attached to the layer 64. The metal backing 72 is connected by a connecting lead 74. Light intensity is measured between the lead 74 and a lead 76 connected to the electrode 70. Voltages sensed between the electrode 70 and the metal backing 72 are proportional to the intensity of incident light impinging upon the wafer 60. Other voltages are also sensed between the various electrodes 68 to determine the lateral position of a light spot on the wafer as already discussed. In the modified wafer construction 60, it is usually more desirable to have the incident light impinge upon the layer 62 rather than on the metal backing 72 although other methods can be used if the metal coating is made transparent.

One of the advantages of the modified wafer construction 60 is that it provides more complete separation between the two different sensing means, namely the sensing means provided by the electrodes 68 and the sensing means provided by the peripheral electrode 70 and the metal backing 72. The modified detector wafer 60 can be used in place of the detector wafer 20 in a device such as the device shown in FIG. 1.

The subject device has many applications and uses. For example, it can be used to provide information to a control circuit for controlling the movement or relative movement of one object relative to another, it can be used to locate a light source relative to a fixed point, it can be used to determine the location of a moving object such as a satellite, missile or airplane, and it has many other similar and related uses and applications. The device can also be used with any kind or frequency of light and can be made to respond to a particular light source even though other light may be received at the same time.

Thus, there has been shown and described a novel light sensitive detector device which fulfills all of the objects and advantages sought therefor. Many changes, variations, modifications and other uses and purposes for the subject detector will, however, become apparent to those skilled in the art after considering this specification and accompanying drawing which shows a preferred form thereof. All such changes, variations, modifications and other uses which do not depart from the spirit and scope of the invention are deemed to be covered by the invention which is limited only by the claims which follow.

What is claimed is:

1. A light sensitive device comprising a wafer-like element formed of two layers of material each having a different conductivity characteristic, a plurality of spaced electrodes connected to one of said layers, another electrode attached to the other layer and extending around the periphery thereof, said peripheral electrode being located outwardly on the element relative to the aforementioned electrodes, means for focusing a spot of light on one of said layers in the region defined within the peripheral electrode, and voltage sensitive means connected between preselected ones of said plurality of electrodes and between said peripheral electrode and at least one of said plurality of electrodes, said voltage sensitive means responding to voltage differences between the associated electrodes connected thereto in response to impingment of said light spot on said layer, movement of said light spot on said one layer resulting in changes in the voltages sensed between said electrodes.

2. The light sensitive device defined in claim 1 wherein said wafer-like element is round and said peripheral electrode extends around the edge of one of said layers, said plurality of electrodes being positioned in pairs adjacent to the ends of preselected diameters of said element.

3. The light sensitive element defined in claim 1 wherein the means for impinging a light spot on the element include a lens positioned between an external light source and the wafer-like element, said lens element having a focal length capable of focusing light from the source in a relatively small spot on said element.

4. The light sensitive device defined in claim 1 wherein a plurality of voltage sensitive means are connected between the peripheral electrode and different preselected ones of said plurality of electrodes.

5. The light sensitive device defined in claim 1 wherein said two layers of material forming the wafer-like element are different semi-conductor materials, one of said materials penetrating the other during formation of the element to form a junction therebetween, and one of said layers releasing holes therein and the other releasing electrons when a light spot is focused thereon, said released holes and electrons producing predetermined voltages between the said spaced electrodes.

6. The light sensitive device defined in claim 5 wherein movement of the position of the light spot on the element changes the voltages produced between the spaced electrodes.

7. The light sensitive device defined in claim 5 in which the voltage sensitive means connected to the peripheral electrode and to preselected ones of the said plurality of electrodes produce voltage indications that are responsive to the intensity of the light spot focused on the element.

8. A light sensitive detector device comprising a light sensitive disc formed of two layers of material each having a different conductivity, one of said materials penetrating the other during formation of the detector to form a junction therebetween, a plurality of spaced electrodes connected to one of said layers, another electrode attached to the other layer and extending around the periphery thereof, said peripheral electrode being located on the detector outwardly relative to the aforementioned electrodes, a housing for mounting the detector, lens means on the housing for focusing light from a remote light source into a relatively small spot on the disc, a first voltage sensitive device connected between two spaced electrodes of said plurality of electrodes, a second voltage sensitive device connected between one of said plurality of spaced electrodes and said peripheral electrode, said first voltage sensitive device producing a voltage indication responsive to the position of the light spot on the disc, and said second voltage sensitive device producing a voltage indication responsive to the intensity of the light spot.

9. A photovoltaic detector comprising a housing having a passageway therethrough, a light sensitive wafer mounted in one end of said passageway and a lens mounted in the opposite end thereof and capable of focusing light from a remote source in a spot on the light sensitive wafer, said light sensitive wafer including a first layer of material having predetermined conductivity characteristics and a second layer of material having a different conductivity characteristic and intimately engaged with said first layer, one of said layers penetrating the other layer to form a junction therebetween, said wafer having a light sensitive area thereon, a pair of spaced connector locations on one of said layers located adjacent to opposite sides of the light sensitive area, a first voltage sensing device connected between said pair of connector locations, a third connector location on the other of said layers, a second voltage sensing device connected between said third connector location and one of the aforesaid spaced connector locations, said third connector location including layer connector means that extend around the light sensitive area outwardly of said pair of spaced connector locations and adjacent to the periphery of the wafer, the first voltage sensing device sensing a voltage of one polarity when the light spot impinges on the light sensitive area closer to one of said spaced connector locations than to the other, said first voltage sensing device sensing a voltage of opposite polarity when the light spot is closer to the other of said spaced connector locations, and said second voltage sensing device sensing a voltage proportional to the intensity of the light spot.

10. The photovoltaic detector defined in claim 9 wherein two pairs of spaced opposed connector locations are provided on the first layer, a similar first voltage sensing device connected between the connector locations of each of said pairs.

11. A light sensitive device comprising a wafer-like element formed by first and second layers of material each having a different conductivity characteristic, means defining an observation field on said first layer including a plurality of spaced electrodes attached to said first layer at locations adjacent to the periphery of the observation field, another electrode attached to said first layer outwardly thereon relative to the aforesaid electrodes, said other electrode extending around the observation field and adjacent to the periphery of the wafer-like element, a metallic coating attached to the second wafer layer on the opposite side of the element from the above mentioned electrodes, first voltage sensitive means connected between preselected ones of said plurality of electrodes, second voltage sensitive means connected between said other electrode and said metallic coating, said last named voltage sensitive means being responsive to the intensity of a light spot impinging upon said wafer.

12. A light sensitive device comprising a wafer-like element including two layers of material each having a different conductivity characteristic, and a junction formed therebetween, means on one of said layers forming an observation field for light to impinge on, a plurality of spaced electrodes attached to said one layer adjacent to the periphery of the observation field, another electrode attached to said one layer, said other electrode extending around the observation field and positioned adjacent to the periphery of the wafer-like element, and a metallic coating attached on the other of said layers on the opposite side of the element from the aforesaid electrodes, a first voltage sensitive device connected between preselected ones of said plurality of spaced electrodes, said first voltage sensitive means producing an output responsive to the position and changes in the position of a light spot impinging upon said wafer-like element in the observation field, a second voltage sensitive device connected between said other electrode and said metallic coating across said junction, said second voltage sensitive device being responsive to the intensity of a light spot impinging upon the wafer-like element, and means for focusing light from a light source in a light spot on said wafer-like element in the observation field.

References Cited

UNITED STATES PATENTS

| | | | |
|---|---|---|---|
| 2,406,139 | 8/1946 | Fink et al. | 250—212 X |
| 2,416,215 | 2/1947 | Rath | 250—212 |
| 2,513,367 | 7/1950 | Scott | 250—203 |
| 2,740,901 | 4/1956 | Graham | 250—212 X |
| 2,812,446 | 11/1957 | Pearson | 250—211.1 |
| 2,879,405 | 3/1959 | Pankove | 250—211.2 |
| 2,953,621 | 9/1960 | Schultz | 250—211.1 |
| 3,028,500 | 4/1962 | Wallmark | 250—211 |
| 3,050,684 | 8/1962 | Sclar | 250—211.1 |
| 3,093,741 | 6/1963 | Meyer | 250—212 |
| 3,211,911 | 10/1965 | Rughe | 250—211 |

RALPH G. NILSON, *Primary Examiner.*

E. STRICKLAND, M. ABRAMSON,
*Assistant Examiners.*